United States Patent
Perelle et al.

[19]

[11] Patent Number: 6,043,628
[45] Date of Patent: Mar. 28, 2000

[54] MANAGEMENT PROCESS FOR ELECTRICAL ENERGY STORAGE BATTERY SYSTEMSAND CONTROL ARRANGEMENT FOR APPLICATION OF THE PROCESS

[75] Inventors: Michel Perelle, Parcay-Meslay; Christophe Morin, Cenon/Vienne, both of France

[73] Assignee: Alcatel, Paris, France

[21] Appl. No.: 09/009,727

[22] Filed: Jan. 21, 1998

[30] Foreign Application Priority Data

Jan. 23, 1997 [FR] France .................................. 97 00684

[51] Int. Cl.[7] ...................................................... H02J 7/00
[52] U.S. Cl. ............................................. 320/119; 320/122
[58] Field of Search ..................................... 320/119, 118, 320/122; 324/434

[56] References Cited

U.S. PATENT DOCUMENTS

| | | | |
|---|---|---|---|
| 4,238,721 | 12/1980 | DeLuca et al. ........................... | 320/122 |
| 5,469,042 | 11/1995 | Ruhling ................................... | 320/122 |
| 5,504,415 | 4/1996 | Podrazhansky et al. ................ | 320/118 |
| 5,543,245 | 8/1996 | Andrieu .................................... | 429/90 |
| 5,578,914 | 11/1996 | Morita ..................................... | 320/122 |
| 5,578,915 | 11/1996 | Crouch, Jr. et al. .................... | 324/428 |
| 5,644,209 | 7/1997 | Chabbert et al. ........................ | 320/122 |
| 5,701,068 | 12/1997 | Baer et al. ............................... | 320/119 |
| 5,703,464 | 12/1997 | Karunasiri et al. ...................... | 320/125 |
| 5,850,136 | 12/1998 | Kaneko .................................... | 320/119 |

FOREIGN PATENT DOCUMENTS

0652620A1   5/1995   European Pat. Off. .

OTHER PUBLICATIONS

Mor et al, "Very Fast Battery Charging and Battery Energy Management" International Vehicle Symposium, vol. 1, 5–7, Dec. 1994, pp. 117–125 XP000488475.

*Primary Examiner*—Peter S. Wong
*Assistant Examiner*—Gregory J. Toatley, Jr.
*Attorney, Agent, or Firm*—Sughrue, Mion, Zinn, Macpeak & Seas, PLLC

[57] ABSTRACT

A management process and a corresponding control arrangement are provided for systems made up of cells in series subjected to alternating charge, possibly fast charge, and discharge, possibly deep discharge, phases. Each cell of the system is associated with a current bypass connected to the terminals of that cell and controlled by a control system that operate in accordance with indications supplied by a measuring system individually assigned to the cells. The process provides for balancing, which can be initiated at any time, that is programmed to be used over a time period that can cover all of the various phases of operation of the system, in connection with an application supplied with power by the system, and which is effected cell by cell until balance, in a battery charge phase, in an idle phase between charges by a charger and discharges by the application and/or in discharge phases.

20 Claims, 2 Drawing Sheets

MANAGEMENT PROCESS FOR ELECTRICAL ENERGY STORAGE BATTERY SYSTEMSAND CONTROL ARRANGEMENT FOR APPLICATION OF THE PROCESS

BACKGROUND OF THE INVENTION

1. Field of the Invention

The invention concerns a management process and a control arrangement for application of this process to a system made up of cells electrically connected in series which each include one or more electrical energy storage units, as is usual in the art, and more particularly to a control arrangement for a high capacity system likely to be subjected to alternating deep discharge and fast charge phases, for example by virtue of being used as a power source for an electric vehicle.

2. Description of the Prior Art

Storage battery systems of the above kind include a relatively large number of cells because of the quantities of energy that need to be stored. The cells of the same storage battery system, which are usually identical, can have slightly different characteristics and consequently vary slightly in performance. Performance differences between series-connected cells of the same storage battery system can increase significantly with time and in the process of successive charging and discharging. This can seriously degrade the operation of the storage battery system and of the application using it.

One solution to limiting any increase in the differences between cells of a storage battery system is to account for the individual evolution of the cells that constitute the system during charging phases in order to avoid unnecessarily overcharging the units of these cells that reach a full charge first.

A solution of this kind is described in document WO-A-9515023, for example, which provides for individual monitoring and balancing devices in combination with each cell of a system. The monitoring and balancing device are provided in a pack, in which the cells are connected in series. This arrangement enables at least a part of the charging current transmitted to a cell to be bypassed when a measured value, and in particular a measured value of the voltage at the terminals of that cell, reaches a maximal set point value. A controller connected to the devices by a common digital line provides a record of the differences between cells and triggers an alarm.

However, the above described solution kind is not entirely satisfactory. In particular this solution can entail high energy dissipation for balancing during charging, especially fast charging with relatively short balancing times, and where these operations are carried out in a systematically time-invariant manner.

SUMMARY OF THE INVENTION

The present invention therefore proposes a management process for systems made up of cells electrically connected in series that each include one or more electrical energy storage battery units to that forms a system intended to be subjected to alternating charge, possibly fast charge, and discharge, (e.g., deep discharge), phases. According to the invention in which each cell is associated with individual current bypass circuit connected to the terminals of cell the current bypass is operated by a controller that operates in accordance with indications supplied by measuring device. In particular, the voltage and/or the temperature of the cell and individually assigned to the cells is measured. The invention ensures cell by cell balancing of the system. According to the invention, balancing can be initiated at any time and in particular before detection of an end of charge phase. The management process is also programed to be used over a time period that can cover all of the various possible operating phases of the system, in connection with an application to which said system supplies power, both during battery charge phases and during idle phases between charges by a charger and discharges by the application and/or during discharge phases.

The invention further proposes a control arrangement for systems made up of cells electrically connected in series that each include one or more electrical energy storage battery units forming a system intended to be subjected to alternating charge, (e.g., fast charge, and discharge) possibly deep discharge, phases. According to the invention, each cell is associated with individual current bypass connected to the terminals of the cell. The current bypass is operated by an individual controller. The controller is supervised by control logic that operates in accordance with indications supplied by a monitor that measures the voltage and/or the temperature of the cell and is individually assigned to the cells. The arrangement also includes common control logic adapted to receive indications of measurements supplied by all of the individual monitors of the cells. The arrangement also processes said indications to generate instructions for the individual current bypass as assigned to each cell via the corresponding individual controller According to an alternative embodiment the indication can also be provided to a common charger connected to end terminals of the system made up of cells connected in series. The arrangement also includes control logic adapted to pursue equilibrium via charge balancing operations specific to each cell through the intermediary of the bypass circuit assigned to that cell over a period that can possibly cover all of the various possible operating phases of the system. In yet another embodiment, charge balancing can also include the use of a common charger.

According to one feature of the invention the common control logic includes the supervision cells of said system operating for the purposes of charge balancing by repeated interrogation of the individual measurement circuits in order to obtain indications relating to measurements that the circuits have carried out. In addition instructions are sent to the bypasses in accordance with the measurements when necessary due to an imbalance between cells.

According to one feature of the invention the individual controller and/or common control logic are provided with memory storing at least one value characteristic of the optimal electrical state of each cell of the system. According to this embodiment common control logic includes a calculator that determines at least one characteristic electrical state threshold value for each characteristic optimal electrical state value and a comparator receiving values supplied by the monitoring circuits for each of the cells of the system and comparing them to the electrical state threshold values, and in particular, to at least one electrical state threshold value determined for each cell.

According to another feature of the invention the common control logic determines the balancing time per cell after appearance of an imbalance determined by the common logic from measurement indications supplied by the individual measuring circuits.

According to yet another feature of the invention the common control logic calculates characteristic capacity value for each cell according to the charging time for that cell and the charging current or currents successively chosen so that the balancing takes account of any capacity differences between cells.

The invention, its features and its advantages are explained in the following description with reference to the figures referred to below.

DETAILED DESCRIPTION OF THE PREFERRED EMBODIMENT

Figure 1:
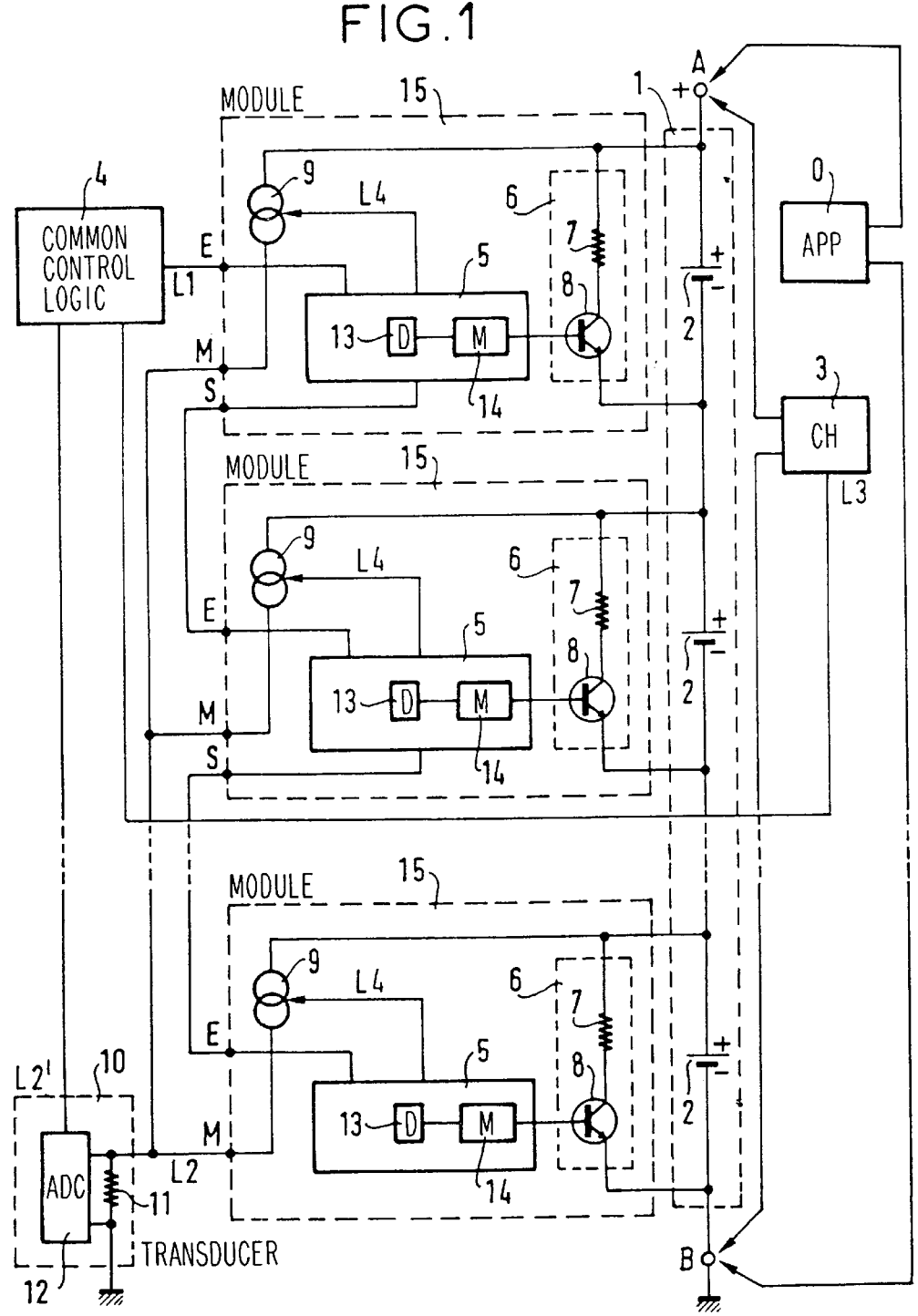
FIG. 1 shows a schematic of one example of a control arrangement in accordance with the invention adapted to apply the management process of the invention to an electrical energy storage battery system.

The arrangement shown in FIG. 1 is designed to be associated with a system 1 made up of cells 2 electrically connected in series. Each includes one or more electrical energy storage battery units and constitute, a high storage capacity power supply for an application such as an electric road vehicle. Here the cells are connected in series between two end terminals A and B of the storage battery system by which the latter can be connected to an application 0, typically an apparatus, in order to supply it with power and/or to a charger 3 in order to be supplied with power.

Common control logic 4 is provided in the arrangement, and is for example, based on a microcontroller with associated auxiliary devices such as random access memories and/or read-only memories, in a manner known to those skilled in the art and therefore will not be further described herein.

The control logic 4 includes at least one input-output interface connected to an output connection L1 enabling it to send control signals to individual control circuits 5 of the arrangement each of which is associated with a respective different cell of the system 1 and to an input connection L2' enabling it to receive measurement indications. These indications are transmitted in the form of signals representing, among other things, the evolution of the state of charge of each cell of the system 1, for example based on voltage measurements carried out on the cells.

The control logic 4 is also able to communicate unidirectionally or bidirectionally with the charger 3 for purposes of supervision, for example by way of a connection L3. Charging is carried out at constant current, the value of the constant charging current being set by the control logic 4 which is adapted to operate on the charger to modify the value of the charging current if necessary.

An individual current bypass circuit 6 is connected to the + and − power terminals of each cell in parallel with the cell to enable a connection to be made between these terminals.

Each bypass circuit 6 comprises a bypass resistor 7 which is preferably external to the circuit, the other components of which are preferably integrated with the components of the individual control circuit that includes them, with the exception of said bypass resistor 7 if the latter cannot be integrated because of its high heat dissipation. The resistor 7 is switched in and out by a current control unit 8 which is of the switching type and is here symbolized by a transistor. This enables part of the charge current reaching a cell to bypass the latter, if necessary, by switching in the resistor 7 of the bypass circuit 6 associated with that cell.

Thus each bypass circuit 6 enables individual discharging of the associated cell, if necessary. This enables a cell to be individually charged to a particular state of charge, for example, and thus authorizes balancing of cells.

Each bypass circuit 6 is controlled by the control logic 4 via the control circuit 5 associated with the same cell as itself.

The control circuits 5 of the control arrangement are connected in series to the control logic 4 via a single-wire control connection L1. The latter transmits control pulses from the control logic 4 in the form of successive pulse streams.

Control organizations of the above type using pulse streams are described in documents FR-A-2713781 and FR-A-2719126, for example, which respectively relate to a unidirectional pulse transmission organization and to a potentially bidirectional pulse transmission organization.

In the example shown, and to simplify this description, a unidirectional transmission organization is used. Each control circuit 5 has an input E enabling it to receive the pulses transmitted to it via the control connection L1 from the control logic 4 and possibly via one or more control circuits 5 on the input side of this connection. As indicated in the two patent applications mentioned above, each control circuit 5 captures the control pulses that are addressed to it and transmits the control pulses which are addressed to the control circuit or circuits 5 on its output side, if any, over the control connection via an output S.

In one embodiment, each control circuit 5 captures an integer number "$\underline{n}$" of the "N" control pulses that each stream it receives contains, these "$\underline{n}$" pulses being those received first by this control circuit for each stream, for example.

Each control circuit 5 controls the bypass circuit 6 associated with the same cell 2 as itself and controls and individual circuit 9 via which the indications corresponding to the measurements carried out at each cell are transmitted.

The control circuits 5 include at least one device for storing measurement signals to be transmitted. The storage device is able to retain at least the last of each of the indications corresponding to the measurements carried out for the purposes of transmission and can be implemented using for example, capacitor type memories. According to one embodiment the transmission circuits 9 are represented as current generators which supply measurement signals transmitted in the form of currents to a common measurement transducer 10. The latter includes, for example, a measurement resistor 11 associated with a converter device 12 for digitizing and possibly preprocessing the signals for the benefit of the control logic 4.

To this end each measurement circuit 9 transmits the measured current signals obtained for the associated cell to the common measurement transducer via a common measurement connection L2 to which each measurement circuit is connected via an individual output M.

In one embodiment, and as indicated above, the measured current indications represent the voltages measured at the terminals of the cells of the system and enable the control logic 4 to determine imbalances between the cells in terms of voltage and/or charge state.

Each indication corresponding to a measurement signal supplied by a measurement circuit 9 is transmitted under the control of the control circuit 5 on receipt of a predetermined control pulse by the latter. In the present example the latter is a pulse sent by the control logic 4 at a predetermined location in the stream of pulses that includes it.

The indications corresponding to the measurement signals produced by a measurement circuit 9, under the supervision of the corresponding control circuit 5, are sent by known means are symbolized by a connection L4 and which are not explained further in connection with FIG. 1, and can be implemented as described in the two French patent applications mentioned above. Furthermore they have only an indirect relation to the subject matter of the present invention. These measurement indications enable the control logic 4 to determine how it must operate the bypass circuits 6 in accordance with the imbalances noted and/or calculated.

Each bypass circuit 6 associated with a cell is controlled by the instructions that are sent by the control logic 4 to the control circuit 5 associated with the same cell as itself.

In a preferred embodiment, a discriminator device 13 distinguishes the functions attributed to the various commands received by a control circuit 5 in accordance with predetermined criteria.

In this embodiment the commands are transmitted by pulses sent from the control logic 4 in the same predetermined pulse location in each of the streams that this logic sends at a particular rate via the control connection L1. The on or off status of a bypass circuit 6 is fixed by the duration of the pulse at a predetermined location that the control circuit associated with this bypass circuit receives for the latter, for example. The control pulses for the bypass circuits 6 are sent at the rate of one pulse per stream and per circuit.

The discriminator device 13 determines if the duration of a pulse received by a control circuit for the associated bypass circuit 6 corresponds to an instruction to switch that bypass circuit on or off. In a preferred embodiment, the reception of a pulse of a first duration, greater than a fixed value, for a bypass circuit corresponds to an instruction to switch on that circuit. The reception of a pulse of a second duration, less than the fixed value mentioned above, corresponds to an instruction to switch it off.

The discriminator device 13 that receives the pulses concerning a bypass circuit 6 corresponds to a conventional comparator circuit, for example, adapted to take account of two different pulse durations and to produce a binary signal the level of which is dependent on the recognized duration.

A memory device 14 at the output of the discriminator device 13 switches and keeps the associated bypass circuit 6 on or off, according to the last command received from the control logic 4 for that circuit, i.e. according to the duration of the received control pulse in this example.

Thus each bypass circuit 6 is switched on upon receipt of a pulse of given duration and at a given location in a first stream and remains on until a pulse at the same predetermined location in another stream has another given duration. The on or off status of the bypass circuit is here maintained for as long as pulses of the same duration at the predetermined location are received.

In a preferred embodiment, each bypass circuit 6 relating to a cell, the control circuit 5 and the corresponding measurement circuit 9 are preferably combined in a common module 15, for example an integrated circuit to which the bypass resistor 7 of the bypass circuit is connected. A plurality of modules 15 can be combined in a subsystem sharing a common integrated circuit.

Figure 2:
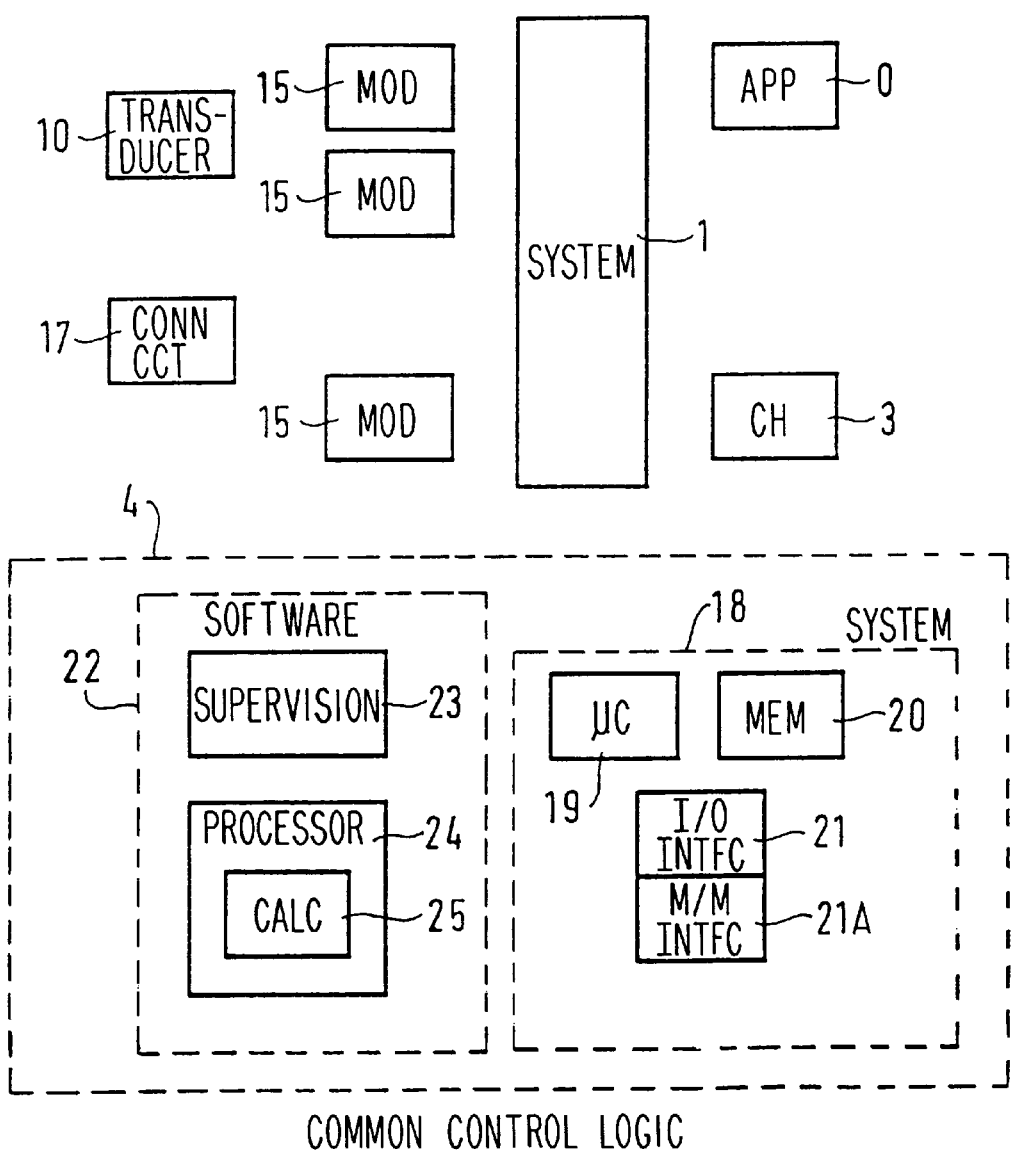
FIG. 2 is a block diagram relating more particularly to the control logic of the arrangement in accordance with the invention.

As indicated above, and as shown in FIG. 2, the control logic 4 is based on a system 18 including at least a microcontroller 19, memories 20 and input-output interfaces 21 enabling it to communicate with the application 0, the charger 3 and the modules 15 and the user, via a man-machine interface 21A for the latter.

The control logic 4 is powered up permanently, for example, in which case it is associated with a circuit 17 that is connected to at least one electrical energy storage battery unit and that possibly has an interface device, not shown, for powering it from a fixed supply, if this logic can be connected to such a supply, for example during charging of the system 1 from an external supply to which the charger 3 is then connected.

In the embodiment under discussion, the control logic 4 is supplied with power from at least one storage battery unit, for example from an auxiliary battery, as also can be the modules 15. The control logic 4 is preferably provided with memory 20, of a type known in itself, enabling it to retain at least some data permanently or semi-permanently, in addition to programs that it contains, in the event of power supply failure, such possibly semi-permanent memory being also associated with the modules.

In the proposed embodiment, the control logic 4 is programmed so that a process of electrical balancing between cells of the system which is deemed to be necessary to maintaining an optimum efficiency of the system 1 for the purposes of supplying power to the application 0 with which it is associated. Here this balancing process is effected in such a manner that it is possible to consider it as continuous, at least to a first approximation, even if in practice the system 1 and the application 0 can be dissociated for reasons associated with the operation of the system and the application.

In a preferred embodiment, the software 22 of the control logic 4 can be active during the various phases of operation of the system 1 in relation to the application 0 and to the charger 3, including during idle phases in particular, if necessary. One consequence of this is that a bypass circuit 6 can be controlled by the control logic 4 for the purposes of balancing during an idle phase, when the system 1 is not used to supply power to the application 0, over and above the usual use of the bypass circuits during the charge, especially fast charge, and/or discharge phase. Given that in some applications at least the idle phases of a system 1 are likely to be much longer than the charge and/or discharge phases, it is thus possible to commence a process of balancing cells of a system at the start of a charge phase and to continue in the idle phase, or even the discharge phase, the balancing usually initiated at the end of the fast or slow charge phase. Accordingly, balancing can be effected with low bypass currents, which reduces energy losses by heat dissipation and consequently reduces costs in the hardware specific to the arrangement in accordance with the invention and in the operation of the application 0 supplied with power by the system 1.

Supervisory 23, possibly separate from the software 22 in which they are incorporated, enable the control logic 4 to carry out practically continuous supervision of the cells of the system 1, in particular to balance them so that they have the same voltage and/or the same capacity difference relative to the maximal capacity provided for each cell, possibly on an individual basis. To this end, the supervisory 23 command repeated (for example cyclic) interrogation of the individual measurement circuits 9 of the cells 2 of the system 1 in order to obtain indications relating to the measurements that these measuring circuits have carried out and which, in a preferred embodiment, they have stored at least temporarily. The indications received by the control logic 4 are exploited by processing software means 24 and possibly stored in memory 20. Among other things, these indications are used to generate the instructions transmitted to the control circuit of each of the modules 15 for the bypass circuit 6 that each module includes. They are also used to control the charger 3.

In a preferred embodiment, the processing software means manage each cell 2 of the system 1 individually in accordance with indications newly received following interrogation of the module 15 associated with that cell or previously processed and stored, preferably since the initial entry into service of the cell in the system 1. This makes it possible to take account of the differences in the characteristics of cells that can occur with time for cells that are generally supposed to be identical. To this end the processing software controls each of the bypass circuits 6 separately via the corresponding memory device 14 in accordance with the characteristics specific to the corresponding cell 2. They preferably operate by sending successive instructions to switch the bypass circuits on and off, each of the latter remaining either on or off depending on the individual instruction received most recently.

At least one value characteristic of the optimal electrical state for each cell 2 of the system 1 is stored in the memory 20 and possibly in the memory devices 14 for evaluating a particular value from a measurement carried out on each cell, for example by comparison with the corresponding stored value. A calculator, 25 included in the processing software 24 supply supplies indications of characteristic threshold values, for example voltages, for operating on signaling at the man-machine interface 21A.

In a different embodiment the calculator 25 are programmed to determine the value of the capacity of each cell as a function of the charging time and the charging current or currents chosen successively during the same charge phase of the system 1.

There is claimed:

1. A management process for systems made up of cells electrically connected in series that each include one or more electrical energy storage battery units to form a system for subjection to alternating charge and discharge phases in which each cell is associated with an individual current bypass circuit connected to terminals of said cell and controlled by a controller operating in accordance with indications supplied by a circuit measuring at least one parameter of said cell, said process comprising the steps of:

measuring the parameter of each of the cells of the system; and providing cell by cell balancing of the system based on said measurements, wherein balancing is initiated at any time over a time period that covers all operating phases of said system when said system is supplying power to an application, and is provided both during battery charge phases and during idle phases between charging and discharging of said application.

2. The measurement process according to claim 1, wherein said measured parameter is a voltage or temperature of said cells.

3. A control arrangement for a battery storage system including a plurality of cells connected in series comprising:

a plurality of common modules, each common module including a measurement circuit measuring a cell current;

a bypass circuit connected in parallel to one of the plurality of cells providing the cell with a particular state of charge;

a controller controlling said bypass circuit and said measurement circuit based on received control signals;

a measurement transducer for receiving measurement indications from said measurement circuits, converting them, and transmitting them;

a common control logic including an input interface for receiving said transmitted measured cell currents, determining if plurality of cells are electrically balanced a cell; and an output interface for transmitting signals to control said common module controllers based on said measured currents, wherein said common control logic operates over a time period covering charge phases and idle phases.

4. The control arrangement of claim 3, wherein said common control logic further comprises supervisor logic for supervising said cells for charge balancing of the cells by repeated interrogation of said individual measurement circuits, obtaining said measurement indications, processing said measurement indications, and transmitting said control signals based on said processed measurement indications.

5. The control arrangement of claim 4, wherein said common control logic further comprises a processor for determining addresses for said control signals to alternate the switching on and off of said bypass circuit connected to a given cell based on said measurement indications from one preceding balancing phase for said given cell.

6. The control arrangement of claim 5, wherein said control logic further comprises a processor for determining the balancing time per cell after appearance of an imbalance determined by said common control logic from measurement indications supplied by said measurement circuits.

7. The control arrangement of claim 6, wherein said control logic further comprises a processor for calculating a characteristic capacity value for each cell according to the time for charging that cell and the charging current successively chosen so that said balancing takes account of any capacity differences between cells.

8. The control arrangement of claim 4, wherein said common control logic further comprises:

a memory storing at least one value characteristic of the optimal electrical state of each cell of said system;

a processor for calculating at least one characteristic electrical state threshold value for each characteristic optimal state value; and a comparator for comparing values corresponding to said measurement indications to said at least one characteristic electrical threshold value.

9. The control arrangement of claim 3 wherein said controller further comprises a discriminator for distinguishing functions attributed to the various control pulses sent by the common control logic.

10. The control arrangement of claim 3, wherein said measurement circuit supplies a measurement signal under control of said controller on receipt of a predetermined control pulse at a predetermined location in the stream of control pulses.

11. A control arrangement for a plurality of cells connected in series comprising:

a plurality of measurement circuits each associated with one of said plurality of cells for measuring said one cell's current;

a plurality of bypass circuits each connected in parallel to one of said plurality of cells providing said one cell with a particular state of charge;

a plurality of controllers each for controlling one of said plurality of bypass circuits and measurement circuits based on received control signals; and a common control logic including an input interface for receiving said measured cell currents, a processor for determining if the plurality of cells are electrically balanced; and an output interface for transmitting signals to control said controllers based on said measured cell currents, wherein said common control logic operates over a time period covering charge phases and idle phases.

12. The control arrangement of claim 11, wherein said common control logic further comprises supervisor logic for supervising said cells for charge balancing of the cells by repeated interrogation of said individual measurement circuits, obtaining said measurement indications, processing said measurement indications, and transmitting said control signals based on said processed measurement indications.

13. The control arrangement of claim 12, wherein said common control logic further comprises:
   a memory storing at least one value characteristic of the optimal electrical state of each cell of said system;
   a processor for calculating at least one characteristic electrical state threshold value for each characteristic optimal state value; and
   a comparator for comparing values corresponding to said measurement indications to said at least one characteristic electrical threshold value.

14. The control arrangement of claim 12, wherein said common control logic further comprises a processor for determining addresses for said control signals to alternated the switching on and off of said bypass circuit connected to a given cell based on said measurement indications from one preceding balancing phase for said given cell.

15. The control arrangement of claim 14, wherein said control logic further comprises a processor for determining the balancing time per cell after appearance of an imbalance determined by said common control logic from measurement indications supplied by said measurement circuits.

16. The control arrangement of claim 15, wherein said control logic further comprises a processor for calculating a characteristic capacity value for each cell according to the time for charging that cell and the charging current successively chosen so that said balancing takes account of any capacity differences between cells.

17. The control arrangement of claim 11 wherein said controller further comprises a discriminator for distinguishing functions attributed to the various control pulses sent by the common control logic.

18. The control arrangement of claim 11, wherein said measurement circuit supplies a measurement signal under control of said controller on receipt of a predetermined control pulse at a predetermined location in the stream of control pulses.

19. A control arrangement for a battery storage system including a plurality of cells connected in series comprising:
   a plurality of common modules, each common module including
      a measurement circuit measuring a cell current;
      a bypass circuit connected in parallel to one of the plurality of cells providing the cell with a particular state of charge;
      a controller controlling said bypass circuit and said measurement circuit based on received control signals;
   a measurement transducer for receiving measurement indications from said measurement circuits, converting them, and transmitting them;
   a common control logic including an input interface for receiving said transmitted measured cell currents, determining if plurality of cells are electrically balanced a cell; and
   an output interface for transmitting signals to control said common module controllers based on said measured currents, wherein
      said plurality of common module controllers are connected in serial communication with each other, said common module controllers including a first controller connected to said common control logic output interface for receiving said control pulses addressed to said first controller and forwarding control pulses addressed to other controllers.

20. A control arrangement for a plurality of cells connected in series comprising:
   a plurality of measurement circuits each associated with one of said plurality of cells for measuring said one cell's current;
   a plurality of bypass circuits each connected in parallel to one of said plurality of cells providing said one cell with a particular state of charge;
   a plurality of controllers each for controlling one of said plurality of bypass circuits and measurement circuits based on received control signals; and
   a common control logic including an input interface for receiving said measured cell currents, a processor for determining if the plurality of cells are electrically balanced; and an output interface for transmitting signals to control said controllers based on said measured cell currents, wherein
      said plurality of common module controllers are connected in serial communication with each other, said common module controllers including a first controller connected to said common control logic output interface for receiving said control pulses addressed to said first controller and forwarding control pulses addressed to other controllers.

* * * * *